United States Patent
Johnston et al.

(10) Patent No.: US 9,040,616 B2
(45) Date of Patent: May 26, 2015

(54) BLEED RESISTANT, OIL-EXTENDED OLEFIN BLOCK COPOLYMER COMPOSITION WITH MICROCRYSTALLINE WAX

(75) Inventors: Robert T. Johnston, Lake Jackson, TX (US); Ashish Batra, Carmel, IN (US); Wenbin Liang, Pearland, TX (US)

(73) Assignee: Dow Global Technologies LLC, Midland, MI (US)

(*) Notice: Subject to any disclaimer, the term of this patent is extended or adjusted under 35 U.S.C. 154(b) by 3 days.

(21) Appl. No.: 13/976,139

(22) PCT Filed: Dec. 14, 2011

(86) PCT No.: PCT/US2011/064882
§ 371 (c)(1),
(2), (4) Date: Jun. 26, 2013

(87) PCT Pub. No.: WO2012/091924
PCT Pub. Date: Jul. 5, 2012

(65) Prior Publication Data
US 2013/0281613 A1    Oct. 24, 2013

Related U.S. Application Data

(60) Provisional application No. 61/428,370, filed on Dec. 30, 2010.

(51) Int. Cl.
| | |
|---|---|
| *C08L 53/00* | (2006.01) |
| *C08L 23/08* | (2006.01) |
| *C08L 91/00* | (2006.01) |
| *C08L 91/06* | (2006.01) |

(52) U.S. Cl.
CPC ............ *C08L 53/00* (2013.01); *C08L 23/0815* (2013.01); *C08L 91/06* (2013.01); *C08L 91/00* (2013.01)

(58) Field of Classification Search
CPC . C08L 2666/02; C08L 2666/24; C08L 91/06; C08K 5/01
USPC .................................................. 524/476, 478
See application file for complete search history.

(56) References Cited

U.S. PATENT DOCUMENTS

| | | | |
|---|---|---|---|
| 3,766,114 A | 10/1973 | Walker et al. |
| 3,830,767 A | 8/1974 | Condon |
| 3,883,439 A | 5/1975 | Bergeron |
| 3,917,607 A | 11/1975 | Crossland et al. |
| 4,060,569 A | 11/1977 | Woods et al. |
| 4,105,619 A | 8/1978 | Kaufman et al. |

(Continued)

FOREIGN PATENT DOCUMENTS

| | | |
|---|---|---|
| EP | 0203402 B1 | 6/1990 |
| WO | 00/60012 A1 | 10/2000 |
| WO | 2005/090427 A2 | 9/2005 |

OTHER PUBLICATIONS

Dobrynin, J. Chem. Phys. (1997) 107 (21), pp. 9234-9238.

(Continued)

*Primary Examiner* — Randy Gulakowski
*Assistant Examiner* — Christopher M Rodd
(74) *Attorney, Agent, or Firm* — Whyte Hirschboeck Dudek S.C.

(57) ABSTRACT

Disclosed are oil-extended olefin block copolymer compositions with microcrystalline wax. The microcrystalline wax reduces oil-bleed while maintaining composition softness.

7 Claims, 2 Drawing Sheets

(56) References Cited

U.S. PATENT DOCUMENTS

| | | | |
|---|---|---|---|
| 4,224,204 | A | 9/1980 | Nichols et al. |
| 4,791,000 | A | 12/1988 | Holemans et al. |
| 4,810,395 | A | 3/1989 | Levy et al. |
| 5,262,479 | A | 11/1993 | Tobing |
| 5,804,540 | A | 9/1998 | Tsaur et al. |
| 7,166,672 | B2 | 1/2007 | Handlin, Jr. et al. |
| 7,501,468 | B2 | 3/2009 | Stumphauzer et al. |
| 7,608,668 | B2 | 10/2009 | Li Pi Shan et al. |
| 2006/0199930 | A1 | 9/2006 | Li Pi Shan et al. |
| 2007/0112127 | A1 | 5/2007 | Soediono et al. |
| 2008/0003195 | A1* | 1/2008 | Arnaud et al. ............ 424/78.03 |
| 2008/0249219 | A1 | 10/2008 | Uehara et al. |
| 2009/0233115 | A1* | 9/2009 | Moldovan ................... 428/523 |
| 2011/0021103 | A1* | 1/2011 | Alper et al. .................. 442/329 |
| 2011/0262747 | A1* | 10/2011 | Yalvac et al. ........... 428/355 EN |
| 2012/0149827 | A1* | 6/2012 | Hu et al. ..................... 524/505 |
| 2012/0165455 | A1* | 6/2012 | Vitrano et al. ............... 524/505 |
| 2013/0259814 | A1* | 10/2013 | Dimotakis et al. ............. 424/61 |
| 2013/0303680 | A1* | 11/2013 | Weaver et al. ............... 524/528 |

OTHER PUBLICATIONS

Potemkin, Physical Review E (1998) 57(6), pp. 6902-6912.

* cited by examiner 20.1% gray scale 34.6% gray scale 51.6% gray scale

100% gray

US 9,040,616 B2

BLEED RESISTANT, OIL-EXTENDED OLEFIN BLOCK COPOLYMER COMPOSITION WITH MICROCRYSTALLINE WAX

CROSS REFERENCE TO RELATED APPLICATION

The present application is the national phase of PCT Patent Application No. PCT/US2011/064882 filed Dec. 14, 2011, which claims priority to U.S. Provisional Application No. 61/428,370, filed Dec. 30, 2010, the entire content of which is incorporated by reference herein.

BACKGROUND

Olefin block copolymers (OBC) are useful for producing soft compounds such as soft touch articles. The block architecture of the OBC results in good tensile strength, compression set and temperature resistance. To make soft touch compositions (i.e., compositions with a low durometer value and/or a low Shore A hardness value), OBC is mixed with an oil. As the amount of oil is increased, so too increases the likelihood of oil-bleed. Oil-bleed is problematic because it produces undesirable haptics in articles fabricated from these compounds.

A need therefore exists for a soft, oil-extended OBC composition with reduced oil-bleed.

SUMMARY

The present disclosure is directed to oil-extended OBC compositions with reduced, or no, oil-bleed. The present compositions contain microcrystalline wax that is an oil-bleed inhibitor. The presence of the microcrystalline wax maintains the softness of the composition, and simultaneously reduces, or eliminates, oil-bleed.

The disclosure provides a composition. In an embodiment, an oil-extended olefin block copolymer composition is provided and includes an olefin block copolymer, an oil, and a microcrystalline wax.

The disclosure provides another composition. In an embodiment, an oil-extended olefin block copolymer composition is provided and includes an olefin block copolymer, from 100 phr to 250 phr of an oil, and from 30 phr to 100 phr of a microcrystalline wax. The composition has a Shore A hardness from 5 to about 50 and a normalized oil-bleed index of less than or equal to 30 after three weeks at 23° C.

The disclosure provides another composition. In an embodiment, an oil-extended olefin block copolymer composition is provided and includes an olefin block copolymer, and a petrolatum.

An advantage of the present disclosure is the provision of a soft oil-extended OBC composition with reduced, or no, oil-bleed.

An advantage of the present disclosure is the provision of an oil-extended OBC composition that is halogen-free.

DETAILED DESCRIPTION

Figure 1:
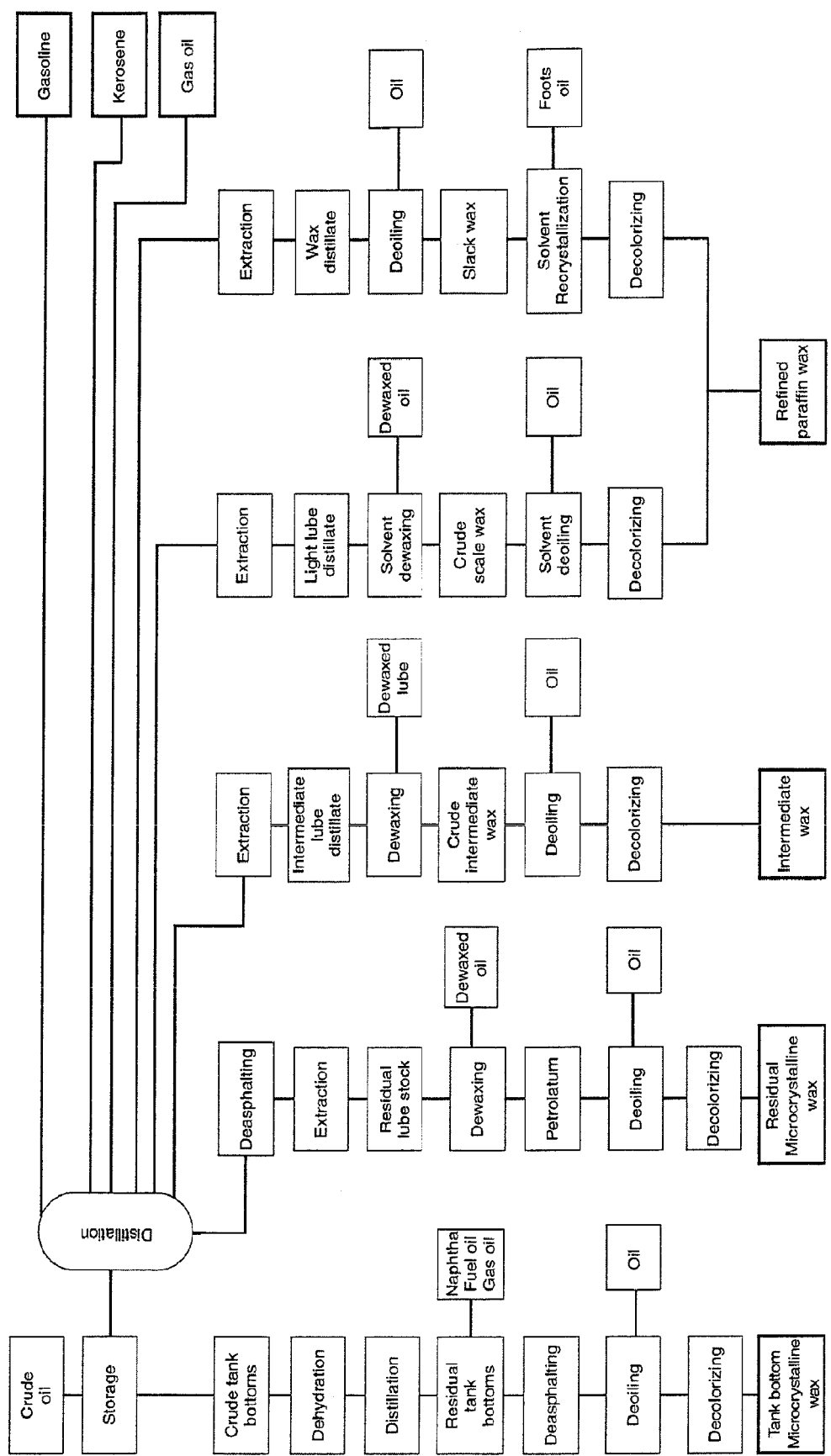
FIG. 1 is a schematic representation of the refinement process for petroleum-derived waxes.

The present disclosure provides an oil-extended olefin block copolymer (OBC) composition. An "oil-extended OBC composition," as used herein, is an OBC composition that contains an (i) OBC and (ii) at least 25 wt % oil, based on the total weight of the composition. In an embodiment, the oil-extended OBC composition contains at least 30 wt %, or at least 40 wt % to 70 wt %, or 60 wt %, or 50 wt % oil. In an embodiment, an oil-extended olefin block copolymer composition is provided and includes an olefin block copolymer, an oil, and a microcrystalline wax.

1. OBC

The term "olefin block copolymer" or "OBC" is an ethylene/α-olefin multi-block copolymer and includes ethylene and one or more copolymerizable α-olefin comonomer in polymerized form, characterized by multiple blocks or segments of two or more polymerized monomer units differing in chemical or physical properties. The terms "interpolymer" and "copolymer" are used interchangeably herein. In some embodiments, the multi-block copolymer can be represented by the following formula:

where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked in a substantially linear fashion, as opposed to a substantially branched or substantially star-shaped fashion. In other embodiments, A blocks and B blocks are randomly distributed along the polymer chain. In other words, the block copolymers usually do not have a structure as follows.

In still other embodiments, the block copolymers do not usually have a third type of block, which comprises different comonomer(s). In yet other embodiments, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

The olefin block copolymer includes various amounts of "hard" and "soft" segments. "Hard" segments are blocks of polymerized units in which ethylene is present in an amount greater than about 95 weight percent, or greater than about 98 weight percent based on the weight of the polymer. In other words, the comonomer content (content of monomers other than ethylene) in the hard segments is less than about 5 weight percent, or less than about 2 weight percent based on the weight of the polymer. In some embodiments, the hard segments include all, or substantially all, units derived from ethylene. "Soft" segments are blocks of polymerized units in which the comonomer content (content of monomers other than ethylene) is greater than about 5 weight percent, or greater than about 8 weight percent, greater than about 10 weight percent, or greater than about 15 weight percent based on the weight of the polymer. In some embodiments, the comonomer content in the soft segments can be greater than about 20 weight percent, greater than about 25 weight percent, greater than about 30 weight percent, greater than about 35 weight percent, greater than about 40 weight percent, greater than about 45 weight percent, greater than about 50 weight percent, or greater than about 60 weight percent.

The soft segments can be present in an OBC from about 1 weight percent to about 99 weight percent of the total weight of the OBC, or from about 5 weight percent to about 95 weight percent, from about 10 weight percent to about 90 weight percent, from about 15 weight percent to about 85 weight percent, from about 20 weight percent to about 80 weight percent, from about 25 weight percent to about 75 weight percent, from about 30 weight percent to about 70 weight percent, from about 35 weight percent to about 65 weight percent, from about 40 weight percent to about 60 weight percent, or from about 45 weight percent to about 55 weight percent of the total weight of the OBC. Conversely, the hard segments can be present in similar ranges. The soft segment weight percentage and the hard segment weight percentage can be calculated based on data obtained from DSC or NMR. Such methods and calculations are disclosed in U.S. patent application Ser. No. 11/376,835, entitled "Ethylene/α-Olefin Block Inter-polymers," filed on Mar. 15, 2006, in the name of Colin L. P. Shan, Lonnie Hazlitt, et. al. and assigned to Dow Global Technologies Inc., the disclosure of which is incorporated by reference herein in its entirety.

The term "crystalline" if employed, refers to a polymer that possesses a first order transition or crystalline melting point (Tm) as determined by differential scanning calorimetry (DSC) or equivalent technique. The term may be used interchangeably with the term "semicrystalline". The term "amorphous" refers to a polymer lacking a crystalline melting point as determined by differential scanning calorimetric (DSC) or equivalent technique.

The term "multi-block copolymer" or "segmented copolymer" is a polymer comprising two or more chemically distinct regions or segments (referred to as "blocks") preferably joined in a linear manner, that is, a polymer comprising chemically differentiated units which are joined end-to-end with respect to polymerized ethylenic functionality, rather than in pendent or grafted fashion. In an embodiment, the blocks differ in the amount or type of incorporated comonomer, density, amount of crystallinity, crystallite size attributable to a polymer of such composition, type or degree of tacticity (isotactic or syndiotactic), region-regularity or regio-irregularity, amount of branching (including long chain branching or hyper-branching), homogeneity or any other chemical or physical property. Compared to block interpolymers of the prior art, including interpolymers produced by sequential monomer addition, fluxional catalysts, or anionic polymerization techniques, the present OBC is characterized by unique distributions of both polymer polydispersity (PDI or Mw/Mn or MWD), block length distribution, and/or block number distribution, due, in an embodiment, to the effect of the shuttling agent(s) in combination with multiple catalysts used in their preparation.

In an embodiment, the OBC is produced in a continuous process and possesses a PDI from about 1.7 to about 3.5, or from about 1.8 to about 3, or from about 1.8 to about 2.5, or from about 1.8 to about 2.2. When produced in a batch or semi-batch process, the OBC possesses PDI from about 1.0 to about 3.5, or from about 1.3 to about 3, or from about 1.4 to about 2.5, or from about 1.4 to about 2.

In addition, the olefin block copolymer possesses a PDI fitting a Schultz-Flory distribution rather than a Poisson distribution. The present OBC has both a polydisperse block distribution as well as a polydisperse distribution of block sizes. This results in the formation of polymer products having improved and distinguishable physical properties. The theoretical benefits of a polydisperse block distribution have been previously modeled and discussed in Potemkin, *Physical Review E* (1998) 57 (6), pp. 6902-6912, and Dobrynin, *J. Chem. Phys.* (1997) 107 (21), pp 9234-9238.

In an embodiment, the present olefin block copolymer possesses a most probable distribution of block lengths. In an embodiment, the olefin block copolymer is defined as having:

(A) Mw/Mn from about 1.7 to about 3.5, at least one melting point, Tm, in degrees Celsius, and a density, d, in grams/cubic centimeter, wherein the numerical values of Tm and d correspond to the relationship:

$$Tm > -2002.9 + 4538.5(d) - 2422.2(d)^2, \text{ and/or}$$

(B) Mw/Mn from about 1.7 to about 3.5, and is characterized by a heat of fusion, ΔH in J/g, and a delta quantity, ΔT, in degrees Celsius defined as the temperature difference between the tallest DSC peak and the tallest Crystallization Analysis Fractionation ("CRYSTAF") peak, wherein the numerical values of ΔT and ΔH have the following relationships:

$$\Delta T > -0.1299(\Delta H) + 62.81 \text{ for AR greater than zero and up to 130 J/g}$$

$$\Delta T \geq 48° \text{ C. for } \Delta H \text{ greater than 130 J/g}$$

wherein the CRYSTAF peak is determined using at least 5 percent of the cumulative polymer, and if less than 5 percent of the polymer has an identifiable CRYSTAF peak, then the CRYSTAF temperature is 30° C.; and/or (C) elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of crosslinked phase:

$$Re > 1481 - 1629(d); \text{ and/or}$$

(D) has a molecular weight fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density and molar comonomer content (based on the whole polymer) within 10 percent of that of the ethylene/α-olefin interpolymer; and/or (E) has a storage modulus at 25° C., G'(25° C.), and a storage modulus at 100° C., G'(100° C.), wherein the ratio of G'(25° C.) to G'(100° C.) is in the range of about 1:1 to about 9:1.

The olefin block copolymer may also have:

(F) a molecular fraction which elutes between 40° C. and 130° C. when fractionated using TREF, characterized in that the fraction has a block index of at least 0.5 and up to about 1 and a molecular weight distribution, Mw/Mn, greater than about 1.3; and/or (G) average block index greater than zero and up to about 1.0 and a molecular weight distribution, Mw/Mn greater than about 1.3. It is understood that the olefin block copolymer may have one, some, all, or any combination of properties (A)-(G).

Suitable monomers for use in preparing the present OBC include ethylene and one or more addition polymerizable monomers other than ethylene. Examples of suitable comonomers include straight-chain or branched α-olefins of 3 to 30, preferably 3 to 20, carbon atoms, such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; cyclo-olefins of 3 to 30, preferably 3 to 20, carbon atoms, such as cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene; di- and polyolefins, such as butadiene, isoprene, 4-methyl-1, 3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidenenorbornene, vinyl norbornene, dicyclopentadiene, 7-methyl-1,6-octadiene, 4-ethylidene-8-methyl-1,7-nonadiene, and 5,9-dimethyl-1,4,8-decatriene; and 3-phenylpropene, 4-phenylpropene, 1,2-difluoroethylene, tetrafluoroethylene, and 3,3,3-trifluoro-1-propene.

In an embodiment, the OBC has a density of less than or equal to about 0.90 g/cc, or less than about 0.89 g/cc. Such low density OBCs are generally characterized as amorphous, flexible and having good optical properties, e.g., high transmission of visible and UV-light and low haze.

In an embodiment, the olefin block copolymer has a density from about 0.85 g/cc to about 0.88 g/cc.

In an embodiment, the olefin block copolymer has a melt index (MI) from about 0.1 g/10 min to about 10 g/10, or from about 0.1 g/10 min to about 1.0 g/10 min, or from about 0.1 g/10 min to about 0.5 g/10 min as measured by ASTM D 1238 (190° C./2.16 kg).

The olefin block copolymer has a 2% secant modulus greater than zero and less than about 150, or less than about 140, or less than about 120, or less than about 100, MPa as measured by the procedure of ASTM D 882-02.

The present OBC has a melting point of less than about 125° C. The melting point is measured by the differential scanning calorimetry (DSC) method described in WO 2005/090427 (US2006/0199930), the entire content of which is incorporated by reference herein.

In an embodiment, the oil-extended OBC composition includes from about 20 wt % to about 60 wt % OBC, or from about 20 wt % to about 50 wt % OBC, or from about 30 wt % to about 40 wt % OBC, or from about 30 wt % to about 35 wt % OBC.

2. Oil

The oil-extended OBC composition includes an oil. The oil can be an aromatic oil, a mineral oil, a naphthenic oil, paraffinic oil, a triglyceride-based vegetable oil such as castor oil, a synthetic hydrocarbon oil such as polybutene oil, a silicone oil, or any combination thereof. A nonlimiting example of a suitable oil is a white mineral oil sold under the tradename HYDROBRITE® 550 available from Sonneborn.

In an embodiment, the oil-extended OBC composition contains at least 25 wt %, or at least 30 wt %, or at least 40 wt %, or at least 45 wt % to 70 wt %, or 55 wt % oil. Weight percent is based on the total weight of the oil-extended OBC composition.

3. Microcrystalline Wax

The oil-extended OBC composition includes a microcrystalline wax. A "microcrystalline wax" is a petroleum-derived wax, is a solid at room temperature, and contains substantial proportions of branched and cyclic (naphthenes, alkyl- and naphthene-substituted aromatics) hydrocarbons, in addition to saturated normal alkanes. Microcrystalline wax has a crystal lattice micro-structure characterized by the presence of strongly branched isoparaffins and naphthenes, which inhibit crystallization. The crystal lattice micro-structure provides the microcrystalline wax with a strong affinity for oil. Microcrystalline wax is produced from a combination of heavy oil distillates and from the sediments of paraffinic crude oil (settling waxes). Microcrystalline wax is distinct and differs from other wax types. Microcrystalline wax excludes animal wax, vegetal wax, bacterial wax, mineral wax, and synthetic wax.

Microcrystalline wax is also distinct from, and excludes, paraffin wax. Microcrystalline wax has a higher concentration of complex branched hydrocarbons with tertiary and quaternary carbon atoms compared to paraffin wax.

The process for producing paraffin wax and microcrystalline wax also differs. The separation of paraffin wax from crude oil occurs during distillation, as shown in FIG. 1. The distillate is processed to remove oil to the degree desired through solvent extraction. It is then decolorized, usually by hydrogenation, but percolation through bauxite may be used. In contrast, microcrystalline wax is produced either from the residual fraction of crude oil distillation or from crude oil tank bottoms. After deasphalting of the residual fraction, heavy lubricating oil is removed by solvent extraction. The filtrate is crude petrolatum, a dark-colored, unctuous material containing oil and microcrystalline wax. Percentages of each may vary, but are usually about 40 wt % wax and about 60 wt % oil. This material is then solvent-extracted for the microcrystalline wax. Unlike paraffin wax, microcrystalline wax holds oil tightly in the crystal lattice of the microcrystalline wax, and the oil does not migrate to the surface. Petrolatum and/or microcrystalline wax may be hydrotreated (hydrogenation) to remove discoloration.

Nonlimiting examples of differences between paraffin wax and microcrystalline wax are provided in Table 1 below.

TABLE 1

| Property | Wax | |
|---|---|---|
| | Paraffin | Microcrystalline |
| flash point, closed cup, ° C. | 204 | 260 |
| viscosity at 98.9° C., mm²/s | 4.2-7.4 | 10.2-25 |
| melting range, ° C. | 46-68 | 60-93 |
| refractive index at 98.9° C. | 1.430-1.433 | 1.435-1.445 |
| average molecular weight | 350-420 | 600-800 |
| carbon atom per molecule | 20-26 | 30-75 |
| ductibility/crystallinity of solid wax | friable to crystalline | ductile-plastic to tough-brittle |

Nonlimiting examples of suitable microcrystalline wax include Multiwax W445 (Sonneborn) (m.p. 76.7-82.2° C.) and Multiwax 180GW (Sonneborn) (m.p. 79.4-86.7° C.), and a combination thereof.

In an embodiment, the oil-extended OBC composition contains from about 30 wt % to about 40 wt % olefin block copolymer, from about 45 wt % to about 55 wt % oil, and from about 10 wt % to about 30 wt % microcrystalline wax.

In an embodiment, the oil-extended OBC composition has a Shore A hardness from 5, or about 10, or about 20 to about 50, or about 40, or about 35, or about 30.

The oil-extended OBC composition may or may not include a filler. In an embodiment, the oil-extended OBC composition is filler-free. In other words, the composition is void or otherwise devoid of a filler. Absence of a filler increases the softness of the oil-extended OBC composition. Nonlimiting examples of fillers (present or absent) from the oil-extended OBC composition include talc, calcium carbonate, chalk, calcium sulfate, clay, kaolin, glass, mica, wollastonite, feldspar, aluminum silicate, calcium silicate, alumina, hydrated alumina such as alumina trihydrate, glass microsphere, ceramic microsphere, thermoplastic microsphere, barite, wood flour, glass fibers, carbon fibers, marble dust, cement dust, magnesium oxide, magnesium hydroxide, antimony oxide, zinc oxide, barium sulfate, titanium dioxide, and titanates.

In an embodiment, the oil-extended OBC composition is halogen-free.

In an embodiment, the oil-extended OBC composition is phthalate-free.

In an embodiment, the oil-extended OBC composition includes an oil/microcrystalline wax pre-mix. An "oil/microcrystalline wax pre-mix" is a blend of any of the foregoing oils and any of the foregoing microcrystalline waxes that is prepared before being blended with the OBC. The pre-mix is prepared by melt blending the oil and the microcrystalline wax at or above the melting temperature of the microcrystalline wax.

In an embodiment, the pre-mix is prepared by placing 100 parts microcrystalline wax in a glass jar and adding 50 parts oil. The components are heated at 80° C. in an oven for eight hours (or overnight). The molten wax/oil mixture is removed from the oven and allowed to cool to room temperature. After cooling, the pre-mix of oil and microcrystalline wax is a homogeneous solid. In an embodiment, the pre-mix comprises from about 60 wt % to about 80 wt % oil and from about 40 wt % to about 20 wt % microcrystalline wax.

Applicants have surprisingly discovered that provision of a microcrystalline wax unexpectedly reduces oil-bleed while maintaining softness in oil-extended OBC compositions. The term "oil-bleed-out" or "oil-bleed" is the phenomenon whereby oil migrates from the interior of a polymeric component to the surface of the polymeric component. Oil-bleed makes the surface sticky and/or slippery. Oil-bleed typically results in adverse "feel" (haptics) and/or adverse "optics" (visual appearance). The term "oil exudation" is the process of oil moving from an interior location to a surface of a polymeric component. Oil exudation yields oil-bleed. In other words, oil-bleed is the end result of oil exudation. Oil-bleed is accelerated by elevated temperatures.

Oil-bleed is evaluated by way of a normalized oil-bleed index (NOBI). NOBI is an optical measurement of the amount of oil absorbed on cigarette paper from an oil-containing polymeric composition. NOBI is calculated according to the following equation:

Normalized Oil-bleed Index=100·(% grey scale sample−% grey scale control)/(100−% grey scale control)

The term "% grey scale sample" is the percent grey scale measured on the aged sample and "% grey scale control" is a measurement on an unaged untreated sheet of cigarette paper. The term "% grey scale" is equal to the percentage of black pixels on a binary (black and white) digital image of the cigarette paper. The image can be obtained for example by digital scanning or digitally photographing a sheet of cigarette paper. NOBI has a range from 0-100. When NOBI=100, the paper is saturated and the test does not register oil-bleed beyond that level. When NOBI=0, the paper has no oil markings and its appearance is similar to that of untreated cigarette paper. Normal experimental error may result in a higher value of NOBI for a control sample (untreated sheet of cigarette paper) than for a treated sample with low oil absorption, thus creating negative values of NOBI.

FIG. 1 shows four degrees of grey scale with conversion to a corresponding NOBI index (using the NOBI equation above) as set forth in Table A below.

TABLE A

| % Grey Scale (FIG. 1) | NOBI Index |
|---|---|
| 20.1% | 0 |
| 34.6% | 18.1 |
| 51.6% | 46.0 |
| 100% | 100 |

In an embodiment, the oil-extended OBC composition has a NOBI index of −10, or −5, or −2, or 1, or 5 to 35, or 30, or 25, or 20, or 15, or 10 after 24 hours at 23° C.

In an embodiment, the oil-extended OBC composition has a NOBI index of −10, or −5, or −2, or 1, or 5, or 7 to 35, or 30, or 25, or 20, or 15, or 10 after 1 week at 23° C.

In an embodiment, the oil-extended OBC composition has a NOBI index of 1, or 5, or 10, or 15 to 60 or 50, or 45, or 40, or 35, or 30, or 25, or 20 after 2 weeks at 23° C.

In an embodiment, the oil-extended OBC composition has a NOBI index of 1, or 5, or 10, or 15 to 60, or 50, or 45, or 40, or 35, or 30, or 25, or 20 after 3 weeks at 23° C.

In an embodiment, the oil-extended OBC composition has a Shore A hardness from 5, or 10, or 20 to 50, or 40, or 30, or 25.

Applicants have surprisingly discovered that provision of the microcrystalline wax unexpectedly reduces oil-bleed while maintaining softness in oil-extended OBC compositions. Bounded by no particular theory, it is believed that the d-spacings in the microcrystalline wax lattice structure increase in direct proportion to the cube root of the volume ratio of neat microcrystalline wax and oil-wax mixture. This indicates that all the oil is incorporated into the wax structure at a near-molecular scale (<3 nm) and that the oil is not trapped as large droplets.

In this way, provision of the microcrystalline wax inhibits or otherwise avoids the phenomenon of oil partition that occurs between (i) the oil and (ii) the OBC hard segments and the soft segments as is evident in compositions containing only oil and OBC. Rather, the microcrystalline wax crystallites form stable structures with the oil in the present composition, thereby advantageously preventing oil exudation. In addition, the flexibility and the small crystalline size of the microcrystalline wax contribute to the clarity, flexibility and softness of the present composition.

The present disclosure provides another composition. In an embodiment, an oil-extended polymeric composition is provided and includes an olefin block copolymer, from 100 phr to 250 phr oil, and from 30 phr to 100 phr microcrystalline wax. The composition has a Shore A hardness from 5 to about 50. The composition also has a normalized oil-bleed index of less than or equal to 30 after three weeks at 23° C.

The term "phr" or "parts per hundred," as used herein, is based on a composition having 100 phr OBC. In other words, the composition contains 100 phr OBC. The term "phr" provides a way to identify the unique relationship between the OBC, the oil, and the microcrystalline wax regardless of other optional components that may be present in the composition.

In an embodiment, the composition of includes 150 phr oil.

In an embodiment, the composition contains from 60 phr to 100 phr microcrystalline wax.

In an embodiment, the oil-extended OBC composition has a NOBI index of −10, or −5, or −2, or 1, or 5, or 7 to 35, or 30, or 25, or 20, or 15, or 10 after 1 week at 23° C.

In an embodiment, the oil-extended OBC composition has a NOBI index of 1, or 5, or 10, or 15 to 60 or 50, or 45, or 40, or 35, or 30, or 25, or 20 after 2 weeks at 23° C.

In an embodiment, the oil-extended OBC composition has a NOBI index of 1, or 5, or 10, or 15 to 60 or 50, or 45 after 2 weeks at 23° C.

In an embodiment, the oil-extended OBC composition has a NOBI index of 1, or 5, or 10, or 15 to 60, or 50, or 45, or 40, or 35, or 30, or 25, or 20 after 3 weeks at 23° C.

In an embodiment, the oil-extended OBC composition has a Shore A hardness from 5, or 10, or 20 to 50, or 40, or 30, or 25.

The disclosure provides another composition. In an embodiment, an oil-extended olefin block copolymer composition is provided and includes an olefin block copolymer, and petrolatum. The term "petrolatum," as used herein, is a microcrystalline wax combined with petroleum oil (and optionally additional components including paraffin wax). In an embodiment, petrolatum is derived from heavy residual petroleum oils and is separated by a dilution and filtering process followed by cooling at about −20° C. Petrolatum has a microcrystalline structure and is a semi-solid at room temperature. It has good oil-holding capacity. Petrolatum is distinct from microcrystalline wax. The petrolatum can be hydrotreated to remove discoloration.

In an embodiment, the petrolatum is a synthetic blend of oil, microcrystalline wax, and optionally paraffin wax.

In an embodiment, the petrolatum is a petroleum jelly. A "petroleum jelly," is a petrolatum adjusted with white mineral oil to a desired viscosity. The melting point range for petroleum jelly is from about 48° C. to about 85° C. Petroleum jelly has an oil content from about 60 wt % to about 90 wt % based on the total weight of the petroleum jelly. A commercial embodiment of petroleum jelly is available under the tradename VASELINE®.

In an embodiment, the oil-extended OBC composition includes from about 20 wt % to about 50 wt %, or 20 wt % to 40 wt %, olefin block copolymer and from about 80 wt % to about 50 wt %, or 80 wt % to 60 wt %, petroleum jelly.

In an embodiment, the oil-extended OBC composition includes OBC, a petroleum jelly, and a microcrystalline wax. In a further embodiment, the oil-extended OBC composition contains 30-50 wt % (or 40 wt %) OBC, 20-40 wt % (or 30 wt %) petroleum jelly, 10-30 wt % (or 20 wt %) oil, and 5-15 wt % (or 10 wt %) microcrystalline wax.

In an embodiment, the oil-extended OBC composition has a NOBI index of −10, or −5, or −2, or 1, or 5 to 30, or 25, or 20, or 15, or 10 after 24 hours at 23° C.

In an embodiment, the oil-extended OBC composition has a NOBI index of −10, or −5, or −2, or 1, or 5, or 7 to 35, or 25, or 20, or 15, or 10 after 1 week at 23° C.

In an embodiment, the oil-extended OBC composition has a NOBI index of 1, or 5, or 10, or 15 to 60 or 50, or 45, or 30, or 20 after 2 weeks at 23° C.

In an embodiment, the oil-extended OBC composition has a NOBI index of 1, or 5, or 10, or 15 to 60 or 50, or 45, or 30, or 20 after 3 weeks at 23° C.

In an embodiment, the oil-extended OBC composition has a Shore A hardness from 1, or 2, or 3, or 5 to 50, or 40, or 30, or 25, or 20, or 10.

Any of the foregoing oil-extended olefin block copolymer compositions may optionally include one or more of the following additives: slip agents, anti-blocking agents, plasticizers oils, antioxidants, UV stabilizers, colorants or pigments, fillers, lubricants, antifogging agents, flow aids, coupling agents, cross-linking agents, nucleating agents, surfactants, solvents, flame retardants, antistatic agents, and any combination thereof. The total amount of the additive(s) can range from about greater than 0, or about 0.001%, or about 0.01%, or about 0.1%, or about 1%, or about 10% to about 80%, or about 70%, or about 60%, or about 50%, or about 40% of the total weight of the polymer blend.

Any of the foregoing oil-extended olefin block copolymer compositions may comprise two or more embodiments disclosed herein.

Any of the foregoing oil-extended olefin block copolymer compositions may be a component of one or more of the following articles: molded articles, extruded articles, overmolded grips, baby bibs, gaskets. Examples of compositions disclosed herein can be used to manufacture durable articles for the automotive, construction, medical, food and beverage, electrical, appliance, business machine, and consumer markets. In some embodiments, the compositions are used to manufacture flexible durable parts or articles selected from toys, grips, soft touch handles, bumper rub strips, floorings, auto floor mats, wheels, casters, furniture and appliance feet, tags, seals, gaskets such as static and dynamic gaskets, automotive doors, bumper fascia, grill components, rocker panels, hoses, linings, office supplies, seals, liners, diaphragms, tubes, lids, stoppers, plunger tips, delivery systems, kitchen wares, footwear, footwear shoe bladders and shoe soles. In other embodiments, the compositions can be used to manufacture durable parts or articles that require a high tensile strength and low compression set. In further embodiments, the compositions can be used to manufacture durable parts or articles that require a high upper service temperature and low modulus.

DEFINITIONS

All references to the Periodic Table of the Elements herein shall refer to the Periodic Table of the Elements, published and copyrighted by CRC Press, Inc., 2003. Also, any references to a Group or Groups shall be to the Groups or Groups reflected in this Periodic Table of the Elements using the IUPAC system for numbering groups. Unless stated to the contrary, implicit from the context, or customary in the art, all parts and percents are based on weight. For purposes of United States patent practice, the contents of any patent, patent application, or publication referenced herein are hereby incorporated by reference in their entirety (or the equivalent US version thereof is so incorporated by reference), especially with respect to the disclosure of synthetic techniques, definitions (to the extent not inconsistent with any definitions provided herein) and general knowledge in the art.

Any numerical range recited herein, includes all values from the lower value to the upper value, in increments of one unit, provided that there is a separation of at least 2 units between any lower value and any higher value. As an example, if it is stated that the amount of a component, or a value of a compositional or a physical property, such as, for example, amount of a blend component, softening temperature, melt index, etc., is between 1 and 100, it is intended that all individual values, such as, 1, 2, 3, etc., and all subranges, such as, 1 to 20, 55 to 70, 197 to 100, etc., are expressly enumerated in this specification. For values which are less than one, one unit is considered to be 0.0001, 0.001, 0.01 or 0.1, as appropriate. These are only examples of what is specifically intended, and all possible combinations of numerical values between the lowest value and the highest value enumerated, are to be considered to be expressly stated in this application. In other words, any numerical range recited herein includes any value or subrange within the stated range.

The terms "blend" or "polymer blend," as used herein, is a blend of two or more components (or two or more polymers). Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term "composition," as used herein, includes a mixture of materials which comprise the composition, as well as reaction products and decomposition products formed from the materials of the composition.

The term "comprising," and derivatives thereof, is not intended to exclude the presence of any additional component, step or procedure, whether or not the same is disclosed herein. In order to avoid any doubt, all compositions claimed herein through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

Normalized oil-bleed index (NOBI) is an optical measurement of the amount of oil absorbed on cigarette paper from an oil-containing polymer composition. NOBI is a phenomenological measurement related not only to the rate of oil migration to the surface but also the rate of oil absorption by the paper and the translucence induced thereby. NOBI is not directly proportional to the mass of the oil on the surface.

The term "polymer" is a macromolecular compound prepared by polymerizing monomers of the same or different type. "Polymer" includes homopolymers, copolymers, terpolymers, interpolymers, and so on. The term "interpolymer" means a polymer prepared by the polymerization of at least two types of monomers or comonomers. It includes, but is not limited to, copolymers (which usually refers to polymers prepared from two different types of monomers or comonomers, terpolymers (which usually refers to polymers prepared from three different types of monomers or comonomers), tetrapolymers (which usually refers to polymers prepared from four different types of monomers or comonomers), and the like.

Test Methods $^{13}$C NMR is performed on OBC polymer to determine weight percent hard segment/soft segment.

A. $^{13}$C NMR Sample Preparation

The sample is prepared by adding approximately 2.7 g of stock solvent to 0.21 g sample in a 10 mm NMR tube, and then purging in a N2 box for 2 hours. The stock solvent is made by dissolving 4 g of PDCB in 39.2 g of ODCB with 0.025M chromium acetylacetonate (relaxation agent). The sample is dissolved and homogenized by heating the tube and its contents at 140-150° C.

B. Data Acquisition Parameters

The data are collected using a Bruker 400 MHz spectrometer equipped with a Bruker Dual DUL high-temperature CryoProbe. The data are acquired using 320 transients per data file, a 7.3 sec pulse repetition delay (6 sec delay+1.3 sec acq. time), 90 degree flip angles, and inverse gated decoupling with a sample temperature of 120° C. All measurements are made on non-spinning samples in locked mode. Samples are homogenized immediately prior to insertion into the heated (125° C.) NMR Sample changer, and are allowed to thermally equilibrate in the probe for 15 minutes prior to data acquisition.

Differential scanning calorimetry (DSC) is performed on compression molded specimens using a TA Instruments Q100 or Q1000 DSC and a crimp-sealed Perkin Elmer pan. Samples are equilibrated at −90° C. for 5 min., then heated at 10° C./min. to 180° C. (capturing the "1$^{st}$ Heat DSC Curve"), held for 5 min., then cooled at 10° C./min. to −90° C. (capturing the "crystallization curve"), held for 5 minutes, then heated at 10° C./min. to 180° C. (capturing the "2$^{nd}$ Heat DSC Curve"). The data is analyzed using TA Universal Analysis software after run completion.

Melt Index (MI) is measured in accordance with ASTM D 1238, Condition 190° C./2.16 kg.

Normalized oil-bleed index (NOBI) is an optical measurement to compare oil-bleed characteristics. Optical measurements are obtained according to the following procedure.

1. Test specimens in the form of approximately 3×6⅛× 0.125 inch specimens are cut from the compression molded plaques. Specimens are cut from areas with minimal bubbles/dimples.
2. Within 2 hours of compression molding, the specimens are overlaid with 3 pieces of ZigZag cigarette paper laid side-to-side, with the length direction of the paper aligned perpendicular to the length direction of the specimens. A sheet of Mylar film is placed on the other side of the paper, so that a sandwich is formed of Mylar film-paper-plaque.
3. The sandwich is placed in 40 or 60° C. ovens or at room temperature in the laboratory, Mylar film layer down. Samples are then aged for 24 hours, 1 week, and 2 weeks or 3 weeks. No mass is present on top of the sample plaques, i.e., the force on the paper is due to the mass of the plaque and gravity. The samples are either supported by a laboratory countertop, the base of the oven chamber, or a metal wire rack in the Thermo oven. No additional support surface is present on the wire racks so the force is concentrated on the wires of the rack, though the Mylar sheet distributes it somewhat. The wires are approximately ⅛ inch diameter and are spaced ¾ inch apart (center to center).
4. Following aging, one of the three papers is removed from the specimen and the specimen is returned to the oven until the third paper is removed at the end of the aging period. Paper removal is difficult in the case of samples with considerable oil bleed since the paper is prone to tearing; if necessary, the torn paper is pieced together as well as possible. The removed paper from a given specimen is adhered (using double-sided tape) to a standard approx. 9×12 inch sheet made from non-glossy black compound.
5. Papers are scanned and analyzed as described below. First a control sample is scanned (a new sheet of cigarette paper that is not attached to a plaque). Then, a paper sample from a plaque sandwich is removed from the sandwich, mounted on the black plaque as described above, and scanned. This is repeated for the other samples. All samples are scanned as quickly as possible, one after another, to minimize potential for scanner drift. Note that the same black plaque is used for all samples, so the mounting and analysis is done sequentially.
6. Scanning is performed using a Xerox WorkCentre M118i copier/fax/scanner. The image is scanned in "Text" mode at 200 dpi, and saved as a TIFF file.
7. Method A. The TIFF file is opened in Microsoft Paint, cropped on two sides, then saved. The image is then opened in Adobe Photoshop CS2 (v.9) and cropped on the other two sides. The "text mode" image is a bitonal image. The percentage of black pixels in the image was the desired result. This is conveniently obtained in this software by first converting it to an 8-bit greyscale image so that a greyscale histogram can be created, with just 2 levels of greyscale, 0 (black) to 255 (white), The percentile of the 0 greyscale level in the histogram is the same as the percentage of black pixels. (This value was called "% grey scale" but is actually a percentile and for the method as described is equal to the "% black pixels" in the bitonal image. The method works because Photoshop CS2 compresses large images by combining 4 pixels into 1 greyscale pixel when using Cache Level 2 thus creating 5 grey scale colors ranging from all white to all black; the grey scale percentile in the histogram is thus equivalent to the percent black pixels in the bitonal image).

Method B. As an alternative to and more direct method than Method A, a bitonal image is opened with ImageJ software (v. 1.41) (National Institutes of Health) and the region of cigarette paper selected using the select tool. Using the Analyze\ Set Measurement menu, "Area Fraction" is selected as a desired output. Then, using the Analyze\Measure menu, the % Area is reported for the selected image area. This % Area is the % black pixels in the selected area.

8. This "% grey scale" (equal to % black pixels) is recorded along with the images in an Excel spreadsheet for both the control sheet as well as the paper sheets in contact with a polymer specimen.

Molded plaques are aged for 24 hrs, 1 week and 2 weeks or 3 weeks (at 23° C. and 60° C.) while resting on sheets of ZigZag cigarette paper. After aging, the cigarette paper is removed and optically scanned against a black background to measure the extent of oil-bleed. A normalized oil-bleed index (NOBI) is calculated according to the following equation:

Normalized Oil-bleed Index=100−(% grey scale sample−% grey scale control)/(100−% grey scale control)

Figure 2:
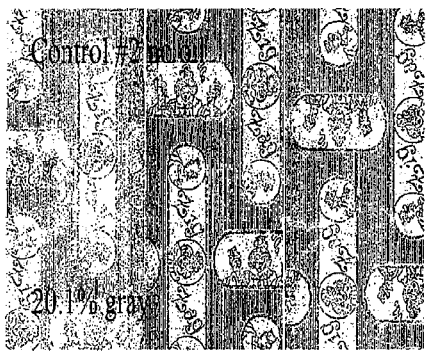
FIG. 2 shows examples of various grey scales used for the normalized oil-bleed index in accordance with an embodiment of the present disclosure.
Figure 2:
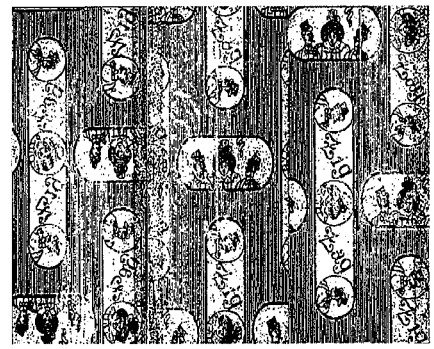
Figure 2:

The term "% grey scale sample" is the percentile grey scale (% black pixels) measured on the aged sample and "% grey scale control" is a measurement on an unaged untreated sheet of cigarette paper. NOBI has a range from 0 to 100. When NOBI=100, the paper is saturated and the test does not register oil-bleed beyond that level. FIG. 2 shows four examples of grey scale: 20.1%, 34.6%, 51.6%, and 100% grey scale. If the first example (20.1%) is used as the control for normalization, then corresponding NOBI values for these four images are 0%, 18.1%, 46.0% and 100%.

Shore A hardness is measured on molded plaques in accordance with ASTM D 2240. This test method permits hardness measurements based on either initial indentation or indentation after a specified period of time, or both. In the examples, a specified time of 10 seconds is used.

By way of example and not by limitation, examples of the present disclosure will now be provided.

EXAMPLES

1. Materials

The materials and properties thereof are provided in Table 2 below.

TABLE 2

| Ingredient | Component | Specifications | Source |
|---|---|---|---|
| D9007 | OBC—ethylene/ octene block copolymer | 0.5 MI, 0.865 g/cc density 11 wt %/89 wt % hard/soft segment split and 18 mol % (46.75 wt %) octene in the soft segment, and 15.6 (42.5 wt %) mol % total octene. | The Dow Chemical Company |
| Hydrobrite 550 | Oil | mineral oil with nominal 70% paraffinic and 30% naphthenic content, and average 541 MW | Sonneborn |
| Wax 180GW | Microcrystalline wax | (m.p. 79.4-86.7° C.). | Sonneborn |
| Microsere 5701 | Microcrystalline wax | (m.p. 70° C.) | The International Group, Inc. |
| Microsere 5806A | Microcrystalline wax | (m.p. 83° C.) | The International Group, Inc. |
| Multiwax W445 | Microcrystalline wax | (m.p. 77-82° C.) | Sonneborn |
| Multiwax 180GW | Microcrystalline wax | (m.p. 79-87° C.) | Sonneborn |
| A-C 820A | Polyethylene wax | 0.97 g/cc ethylene homopolymer | Honeywell |
| Octacosane | Paraffin wax | $C_{28}$ n-alkane (m.p. 57-62° C.). | Aldrich Chemical Company |
| Vaseline | Petrolatum | Petroleum jelly | Unilever |
| G1958 | Petrolatum | proprietary mixture of waxes and oils (wax m.p. 71-77° C.) | Sonneborn |

2. Preparation

Samples are prepared as follows:

Oil is imbibed into OBC polymer at 50-60° C. overnight, at a minimum.

Compounding is accomplished using a HAAKE torque rheometer with a 190° C. Rheomix 3000E mixing bowl and roller blades at nominal mixing speed of 60 rpm for a period of 5-6 minutes after all of the formulation components are added to the mixing bowl.

Compression molding is done at 190° C. using an approximately 125 mil thick chase, using the following program:

2 minutes at 3000 psi
2 minutes at 5000 psi
5 minutes at 40,000 psi
Cool for 5 minutes at 40,000 psi Samples are tested for hardness and oil bleed as previously described.

Molded plaques are aged (24 hrs, 1 week and 2 weeks or 3 weeks at 23° C. and 60° C.) while resting on sheets of ZigZag cigarette paper. After aging, the cigarette paper is removed and optically scanned against a black background to measure the extent of oil-bleed. The normalized oil-bleed index (NOBI) is calculated. The hardness of each sample is measured. The results are shown in Tables 3A-3B, 4A-4B, and 5A-5B below.

TABLES 3A-3B

| 3A Ingredient | 1 Cntl Wt %* | 1 Wt (g)+ | 1 phr | 5 64 phr 180GW Wt %* | 5 Wt (g)+ | 5 phr | 6 AC820A Wt %* | 6 Wt (g)+ | 6 phr | 9 100 phr 180GW Wt %* | 9 Wt (g)+ | 9 phr | 10 32 phr 180GW Wt %* | 10 Wt (g)+ | 10 phr | 11 32 phr octacosane Wt %* | 11 Wt (g)+ | 11 phr | 12 hi oil + wax Wt %* | 12 Wt (g)+ | 12 phr |
|---|---|---|---|---|---|---|---|---|---|---|---|---|---|---|---|---|---|---|---|---|---|
| D9007 | 40% | 76.0 | 100 | 32% | 60.5 | 100 | 32% | 60.5 | 100 | 29% | 54.3 | 100 | 35% | 67.4 | 100 | 35% | 67.4 | 100 | 23% | 43.9 | 100 |
| Hydrobrite 550 | 60% | 114.0 | 150 | 48% | 90.8 | 150 | 48% | 90.8 | 150 | 43% | 81.4 | 150 | 53% | 101.1 | 150 | 53% | 101.1 | 150 | 54% | 102.2 | 233 |
| Wax 180GW (Sonneborn) | 0% | 0.0 | | 20% | 38.7 | 64 | 0% | 0.0 | | 29% | 54.3 | 100 | 11% | 21.6 | 32 | 0% | 0.0 | | 23% | 43.9 | 100 |
| A-C 820A (Honeywell) | 0% | 0.0 | | 0% | 0.0 | | 20% | 38.7 | 64 | 0% | 0.0 | | 0% | 0.0 | | 0% | 0.0 | | 0% | 0.0 | |
| Octacosane | 0% | 0.0 | | 0% | 0.0 | | 0% | 0.0 | | 0% | 0.0 | | 0% | 0.0 | | 11% | 21.6 | 32 | 0% | 0.0 | |
| TOTAL | 100% | 190.0 | 250 | 100% | 190.0 | 314 | 100% | 190.0 | 314 | 100% | 190.0 | 350 | 100% | 190.0 | 282 | 100% | 190.0 | 282 | 100% | 190.0 | 433 |

3B Normalized Oil Normalized Oil Bleed Index (NOBI) and Durometer results

| | 1 | 5 | 6 | 9 | 10 | 11 | 12 |
|---|---|---|---|---|---|---|---|
| 24 hrs @ 23° C. | 41 | −2 | 16 | 9 | 24 | 4 | 15 |
| 24 hrs @ 60° C. | 88 | 76 | 28 | 59 | 95 | 11 | 100 |
| 1 week @ 23° C. | 71 | 7 | 13 | 2 | 33 | −3 | 18 |
| 1 week @ 60° C. | 99 | 98 | 18 | 95 | 100 | 100 | 100 |
| 3 week @ 23° C. | 93 | 14 | 13 | 16 | 60 | 15 | 45 |
| 3 week @ 60° C. | 100 | 100 | 49 | 100 | 100 | 100 | 100 |
| Shore A Hardness (10 sec.), average of 5 readings | 5 | 28 | 41 | 38 | 16 | 36 | 21 |

*= Wt % based on total weight of composition
+= Component weight in grams (composition total weight: 190 g)

TABLES 4A-4B

| 4A Ingredient | 13 Vaseline | | | 14 Microsere 5701 | | | 15 Microsere 5806A | | | 16 Cntl | | |
|---|---|---|---|---|---|---|---|---|---|---|---|---|
| | Wt %* | Wt (g)+ | phr | Wt %* | Wt (g)+ | phr | Wt %* | Wt (g)+ | phr | Wt %* | Wt (g)+ | phr |
| D9007 | 40% | 76.0 | 100 | 30% | 57.0 | 100 | 30% | 57.0 | 100 | 40% | 76.0 | 100 |
| Hydrobrite 550 | 0% | 0.0 | | 60% | 114.0 | 200 | 60% | 114.0 | 200 | 60% | 114.0 | 150 |
| Vaseline pet. jelly | 60% | 114.0 | 150 | 0% | 0.0 | | 0% | 0.0 | | 0% | 0.0 | |
| Microsere 5701 wax | 0% | 0.0 | | 10% | 19.0 | 33.3 | 0% | 0.0 | | 0% | 0.0 | |
| Microsere 5806A wax | 0% | 0.0 | | 0% | 0.0 | | 10% | 19.0 | 33.3 | 0% | 0.0 | |
| TOTAL | 100% | 190.0 | 250 | 100% | 190.0 | 333 | 100% | 190.0 | 333 | 100% | 190.0 | 250 |

| 4B Normalized Oil Normalized Oil Bleed Index (NOBI) and Durometer results | | | | |
|---|---|---|---|---|
| | 13 | 14 | 15 | 16 |
| 24 hrs @ 23° C. | 6 | 55 | 52 | 30 |
| 24 hrs @ 60° C. | 83 | 94 | 97 | 82 |
| 1 week @ 23° C. | 5 | 87 | 73 | 76 |
| 1 week @ 60° C. | 91 | 100 | 100 | 99 |
| 2 week @ 23° C. | 10 | 94 | 92 | 95 |
| 2 week @ 60° C. | 100 | 100 | 100 | 100 |
| Shore A Hardness (10 sec.), average of 5 readings | 30 | 5 | 8 | 4 |

*= Wt % based on total weight of composition
+= Component weight in grams (composition total weight: 190 g)

150 phr Vaseline® provides a composition resistant to oil-bleed at room temperature with acceptable softness (Shore A 30). Microsere wax examples illustrate that when the ratio of microcrystalline wax/oil concentration for a given polymer concentration is too low, then oil bleed is not adequately suppressed.

TABLES 5A-5B

5A

| 5A Ingredient | 17: 150 phr Vaseline Wt%* | 17 Wt(g)⁺ | 17 phr | 18: 166 phr Vaseline Wt%* | 18 Wt(g)⁺ | 18 phr | 19: 214 phr Vaseline Wt%* | 19 Wt(g)⁺ | 19 phr | 20: 214 phr G1958 Wt%* | 20 Wt(g)⁺ | 20 phr | 21: 64 phr Octacosane Wt%* | 21 Wt(g)⁺ | 21 phr | 22: 64 phr Wax W445 Wt%* | 22 Wt(g)⁺ | 22 phr | 23: 64 phr Wax 180GW Wt%* | 23 Wt(g)⁺ | 23 phr |
|---|---|---|---|---|---|---|---|---|---|---|---|---|---|---|---|---|---|---|---|---|---|
| D9007 Hydrobrite 550 | 40% | 76.0 | 100 | 38% | 71.4 | 100 | 32% | 60.5 | 100 | 32% | 60.5 | 100 | 32% | 60.5 | 100 | 32% | 60.5 | 100 | 32% | 60.5 | 100 |
| | 0% | 0.0 | 150 | 0% | 0.0 | 150 | 0% | 0.0 | 214 | 0% | 0.0 | 150 | 48% | 90.8 | 150 | 48% | 90.8 | 150 | 48% | 90.8 | 233 |
| Vaseline Petrolatum G1958 | 60% | 114.0 | | 62% | 118.6 | 166 | 68% | 129.5 | | 68% | 129.5 | 214 | 0% | 0.0 | | 0% | 0.0 | | 0% | 0.0 | |
| Wax W445 (Sonneborn) | 0% | 0.0 | | 0% | 0.0 | | 0% | 0.0 | | 0% | 0.0 | | 0% | 0.0 | | 20% | 38.7 | 64 | 0% | 0.0 | |
| Wax 180GW (Sonneborn) | 0% | 0.0 | | 0% | 0.0 | | 0% | 0.0 | | 0% | 0.0 | | 0% | 0.0 | | 0% | 0.0 | | 20% | 38.7 | 64 |
| Octacosane | 0% | 0.0 | | 0% | 0.0 | | 0% | 0.0 | | 0% | 0.0 | | 20% | 38.7 | 64 | 0% | 0.0 | | 0% | 0.0 | |
| TOTAL | 100% | 190.0 | 250 | 100% | 190.0 | 266 | 100% | 190.0 | 314 | 100% | 190.0 | 350 | 100% | 190.0 | 282 | 100% | 190.0 | 282 | 100% | 190.0 | 433 |

5B Normalized Oil Normalized Oil Bleed Index (NOBI) and Durometer results

| | 17 | 18 | 19 | 20 | 21 | 22 | 23 |
|---|---|---|---|---|---|---|---|
| 24 hrs @ 23° C. | 1 | 10 | 17 | 0 | -2 | 15 | -2 |
| 24 hrs @ 60° C. | 85 | 68 | 96 | 49 | 85 | 51 | 68 |
| 1 week @ 23° C. | 3 | 9 | -2 | 14 | 12 | 6 | -6 |
| 1 week @ 60° C. | 85 | 81 | 100 | 96 | 93 | 65 | 90 |
| 3 week @ 23° C. | 8 | 3 | 6 | 21 | 11 | 20 | 10 |
| 3 week @ 60° C. | 100 | 99 | 100 | 100 | 100 | 100 | 100 |
| Shore A Hardness (10 sec.), average of 5 readings | 26 | 24 | 22 | 26 | 57 | 19 | 23 |

*= Wt % based on total weight of composition
⁺= Component weight in grams (composition total weight: 190 g)

Assuming Vaseline® petroleum jelly has 30% wax and 70% oil then Sample 19 (214 phr Vaseline®) has 150 phr oil and 64 phr wax relative to OBC polymer, yet oil bleed is effectively controlled at room temperature. 214 phr G1958 petrolatum also has low oil bleed at room temperature. 64 phr octacosane controls room temperature oil bleed but yields high Shore A hardness. Wax W445 and Wax 180GW, both microcrystalline waxes, cause low oil bleed at room temperature and maintain low compound hardness.

Results

Applicants unexpectedly discovered that microcrystalline wax provides excellent oil bleed resistance (i.e., low NOBI index, particularly at 23° C.) with minimal increase in Shore A hardness.

It is specifically intended that the present disclosure not be limited to the embodiments and illustrations contained herein, but include modified forms of those embodiments including portions of the embodiments and combinations of elements of different embodiments as come within the scope of the following claims.

What is claimed is:

1. An oil-extended olefin block copolymer composition comprising:
   from 30 wt % to 40 wt % of a polymer, wherein the polymer consists of an ethylene/α-olefin multi-block copolymer as the only polymeric component of the composition;
   from 45 wt % to 55 wt % of an oil;
   from 10 wt % to 30 wt % of a microcrystalline wax; and
   the composition is halogen-free and has a Shore A hardness from 5 to 50 and a normalized oil bleed index (NOBI) from 1 to 60 after 3 weeks at 23° C.

2. The composition of claim 1 wherein the olefin block copolymer has a density from about 0.85 g/cc to about 0.88 g/cc.

3. The composition of claim 1 wherein the composition is filler-free.

4. The composition of claim 1 wherein the oil and the microcrystalline wax are components of an oil/microcrystalline wax pre-mix.

5. The composition of claim 4 wherein the pre-mix comprises from about 60 wt % to about 80 wt % oil and from about 40 wt % to about 20 wt % microcrystalline wax.

6. The composition of claim 1 having a normalized oil-bleed index of less than 30 after 1 week at 23° C.

7. The composition of claim 1 having a normalized oil-bleed index (NOBI) of less than 30 after 3 weeks at 23° C.

* * * * *